Sheet 2. 2 Sheets.
Thomas, Mast & Gardiner
Grain-Drill.
Nº 93369. Patented Aug. 3. 1869.
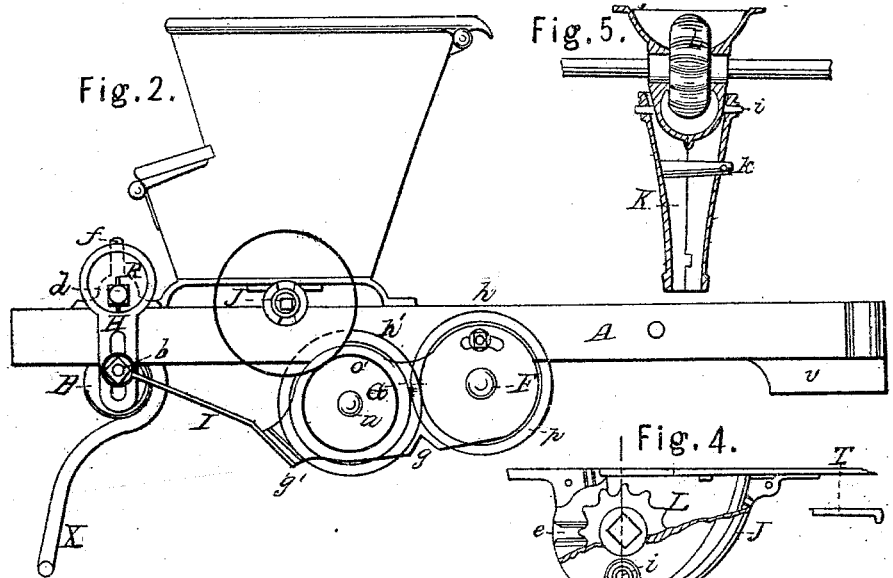
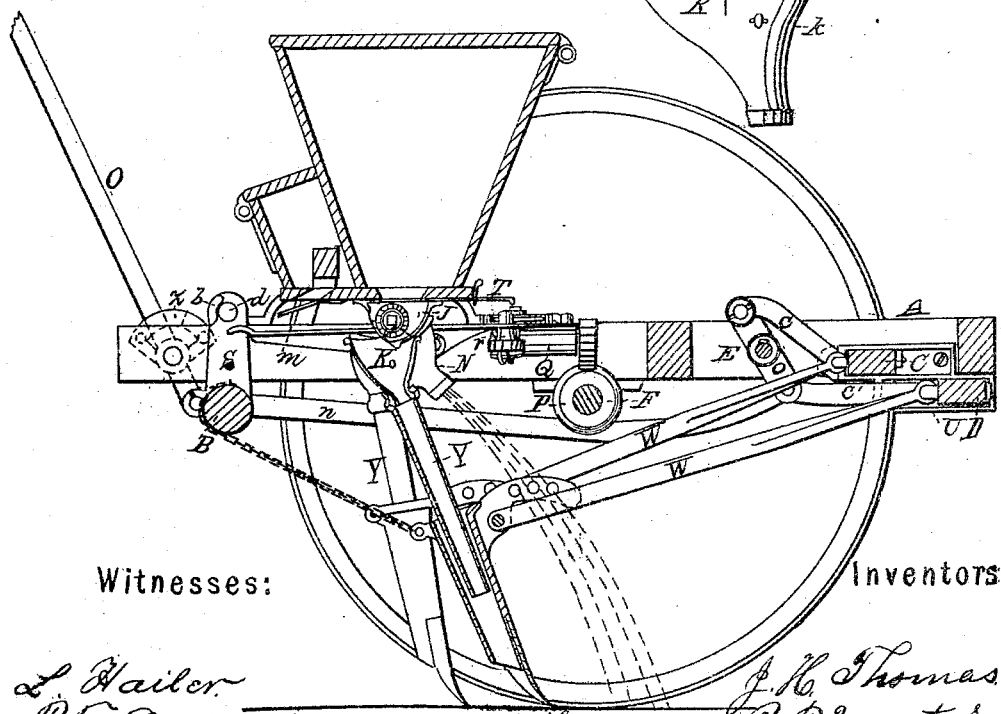
Witnesses:
L. Hailer
P. T. Dodge
Inventors
J. H. Thomas
P. P. Mast &
C. O. Gardiner
by their Atty
Dodge & Munn

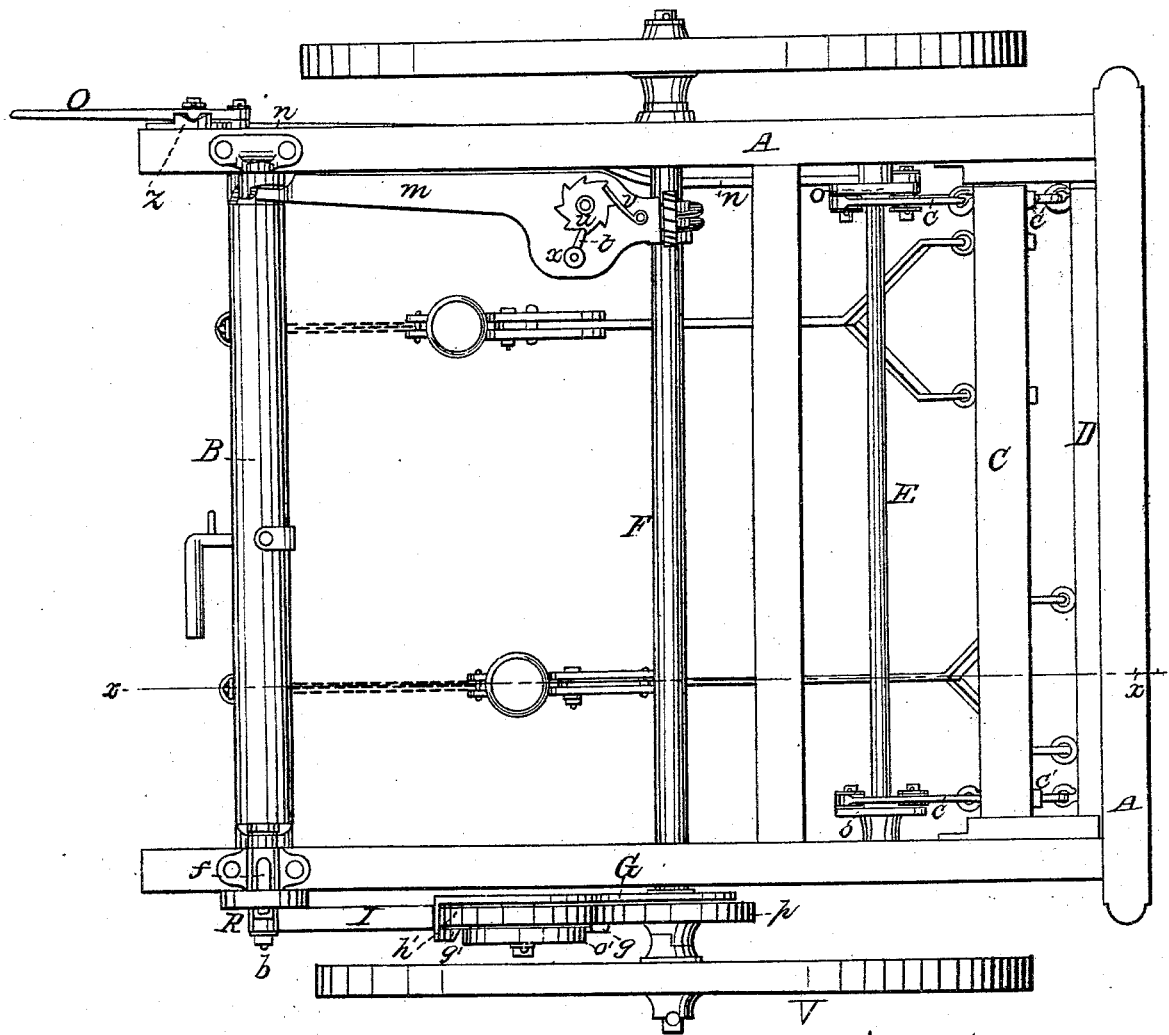

United States Patent Office.

JOHN H. THOMAS, PHINEAS P. MAST, AND CHARLES O. GARDINER, OF SPRINGFIELD. OHIO, ASSIGNORS TO JOHN H. THOMAS AND PHINEAS P. MAST.

Letters Patent No. 93,369, dated August 3, 1869.

IMPROVEMENT IN GRAIN-DRILLS.

The Schedule referred to in these Letters Patent and making part of the same.

*To all whom it may concern:*

Be it known that we, JOHN H. THOMAS, PHINEAS P. MAST, and CHARLES O. GARDINER, of Springfield, in the county of Clark, and State of Ohio, have invented certain new and useful Improvements in Grain-Drills; and we do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use our invention, we will proceed to describe it.

Our invention consists in certain improvements in the construction of grain-drills, which improvements relate to various parts thereof, as hereinafter explained.

Figure 1 is a top plan view, with the hopper removed;

Figure 2 is a side elevation, with the wheels and drag-bars removed;

Figure 3 is a longitudinal vertical section, taken on the line $x$–$x$ of fig. 1; and Figures 4 and 5 are views of portions detached.

In constructing our improved drill, we use a frame, A, mounted on two wheels, in the usual manner, the whole being mounted on an axle, F, about the centre of the frame, one wheel being secured rigidly to the axle, and the other turning loosely thereon.

In this drill we use, for feeding out the grain, the rotating cylinders patented October 13, 1868, a series of which is located underneath the hopper, on a shaft, having a spur-wheel secured to one end, and driven by a similar wheel, $p$, secured to the axle F, inside of the driving-wheel V, as shown in fig. 1.

In this style of drill, it is necessary to throw the feeding-mechanism out of gear, whenever it is desired to stop feeding out the grain, as in turning at the ends of the field, and also to have some means of varying the quantity of grain sown, and for these purposes we pivot upon the axle F, a plate, G, fig. 2, the rear end of which has attached to it a spring-arm, I, the rear end of this arm being secured by a bolt and nut, $b$, to a slotted bar, H, as shown in fig. 2.

This bar, H, is located at the rear end of the frame, on one side, and has its upper end made in the form of a ring, to encircle an eccentric, R, which latter is secured to a journal, $d$, on which the hoisting-bar, B, is pivoted eccentrically, by means of arms S, as represented in fig. 3, so that when the bar B is raised, by means of its levers, X, to elevate the drill-tubes, the eccentric, R, is turned down, and thereby lowers the bar H, which carries with it the rear end of plate G.

On this plate, G, there is a stud, or pin, $a$, on which is mounted a wheel, $h'$, which engages with the driving pinion $p$, and on this same stud is also mounted another pinion, $o'$, which latter gears into the pinion on the end of the shaft on which the feed-rollers or cylinders L are mounted.

By this arrangement, it will be seen that whenever the bar B is turned up to raise the drill-tubes from the ground, the same movement lowers the rear end of the plate G, and thereby throws the pinion $o'$ out of gear with the pinion of the cylinder-shaft, and stops the feeding; and whenever the bar B is turned down, the pinions are thrown into gear again, and the tubes dropped at the same time.

If the parts were entirely rigid, there would be danger of breaking the teeth of the pinions, as the ends of the teeth are apt to strike upon one another, as they are thrown into gear; and hence we make use of the spring-arm I, which entirely obviates this danger.

In order to vary the feed, we change the pinion $o'$, by substituting a larger or smaller one, as may be desired.

If a larger one be used, it is obvious that it would come in contact with the pinion on the cylinder-shaft before the eccentric had assumed its proper position, and if, on the other hand, a smaller one were used, it would not be brought into gear with the pinion on the feed-shaft; and hence, we provide the slot in the bar H, by which the rear end of plate G may be adjusted higher or lower, so as to enable us to use any desired size of pinion, in place of $o'$, whereby we are enabled to make a great variety of changes in the feed, and thus adapt the machine to the sowing of all kinds and quantities of grain.

A still greater number of changes can be made by transposing the pinion $o'$, placing it on the end of the feed-shaft, and using that on the feed-shaft in place of $o'$. In this way we are enabled to make a great number of changes by the use of but few wheels.

As the pinions $p$ and $h'$ revolve toward each other from below, there is danger of stalks or trash getting between them, and clogging or breaking them, and to prevent this, we secure to the lower edge of the plate G, at a point directly below where these pinions come together, a guard, $g$, which consists of a horizontally-projecting lip or flange, as represented in fig. 2, this flange projecting out slightly beyond the outer surface of these wheels, as shown in fig. 1, and which, while adding but a trifle to the weight, serves, in a very effectual manner, to prevent the difficulty mentioned; there being also a similar flange or guard, $g'$, at the rear end of plate G, behind the pinion $h'$, as shown in figs. 1 and 2.

In constructing this style of drills heretofore, it has been customary to place under the feed-rollers or cylinders a board, with rigid spouts, to receive the grain, and convey it to the tubes, the rubber tubes being attached at their upper ends rigidly to this grain-board, their lower ends entering the drill-teeth or hoes.

As the tubes were thus stationary, and could not move to accommodate themselves to the changing positions of the teeth, they were liable to be chafed or collapsed by the movements of the teeth; and it was especially difficult to incline these tubes, Y, so as to enter and work freely within the teeth, when the latter were arranged in two rows, as represented in fig. 3.

In such cases it was necessary to change one-half of the spouts above the grain-board, and also one-half of the tubes leading to the drill-teeth, in order to adapt them to the changed position of the teeth.

To obviate these difficulties, we now provide a series of metal conductors or spouts, K, the form of which is shown more clearly in fig. 4, and to the lower end of these we attach the rubber tubes Y, as shown in fig. 3.

These conductors, K, we make of cast-iron, in two parts, they being divided vertically through the centre, as shown in fig. 5, one half being cast with a pin, k, projecting from its inner face, of sufficient length to pass through a small hole in the other half, and receive a small pin outside, as shown in fig. 4, by which the two parts are held securely together, and yet can be separated when necessary to attach it to the cup J, to which it is pivoted, by ears, at its upper end, on small projecting journals i, formed on the exterior and lower portion of the cup, as represented in figs. 4 and 5.

This conductor or spout, K, being thus pivoted to the cup, receives the grain as it is fed out by the feed-roller L, and conveys it to the rubber tube Y, which, in turn, conveys it to the drill-tooth.

By being thus pivoted, the tubes Y can be inclined forward or backward, to suit the position of the drill-teeth, without trouble or danger of injuring the tubes Y, or of detaching any of the parts.

In order to insure the more certain and regular feeding or delivery of the grain, we have added another improvement to the cup or shell, which encloses the feed-roller L.

This improvement consists in forming, on the inner face of the cup, on each side, a projection, e, as shown in figs. 4 and 5, the object being to prevent the grain from being carried above that point by the roller, and cause it to flow out at the opening in an even and regular stream.

The drill-teeth are constructed and attached to drag-bars in the usual manner, but for the purpose of changing the position of the teeth, so that they may be arranged to stand in a single or double row at will, we attach the front end of the drag-bars W to two separate bars, C and D, the drag-bars being attached alternately to one and the other of these sliding bars C D.

In order to support and guide these cross-bars, we construct a metal plate, U, fig. 3, with grooves to receive and hold the ends of the bars C D, and attach one of these plates to the frame at its front inner corner, on each side, with the ends of the cross-bars inserted in the grooves thereof.

Directly in rear of these cross-bars we locate, crosswise of the frame, a rock-shaft, E, as shown in figs. 1 and 2.

Upon this shaft, near each end, we secure cross-arms o, which project equally at opposite sides, and to these arms we pivot, at opposite ends, rods c and c', the opposite end of the latter being pivoted to the cross-bars C and D, as shown more clearly in fig. 3.

It will be seen, that with these parts thus arranged, if the rock-shaft E be turned in either direction, the bars C and D will be moved in opposite directions, one being shoved forward and the other drawn back simultaneously, and consequently the drag-bars, with their teeth, will also be correspondingly moved.

The length of the drag-bars being uniform, it follows that when the cross-bars C and D are moved, so as to occupy the same vertical plane, or be one directly over the other, then the drill-teeth will all stand in one uniform row, crosswise of the frame, in the ordinary manner of grain-drills; but when, by turning the rock-shaft E, the cross-bars C D are made to assume the position shown in fig. 3, then the teeth are made to stand in two rows, as there represented, the teeth of the two rows alternating, the object of which is to prevent the stalks, weeds, and trash of any kind from lodging or clogging against the front of the teeth, and preventing them from entering the earth, and properly depositing the seed.

By having both set of teeth move in opposite directions to each other, the inclination of the tubes Y is divided, that is to say, one set is inclined half the distance forward, and the other set one-half the distance backward, and thus they are all left much more free to play loosely in the teeth than they would be if the entire movement were made by one set, as is the case where only one set of teeth is moved, and by having these tubes attached to the pivoted conductors K, they readily adapt themselves to these changed positions, without bending or injuring the tubes Y, and without interfering at all with the elevation of the teeth, as would otherwise be the case.

In order to readily effect these changes in the position of the teeth, we pivot, at the rear end of the frame, a lever, O, as shown in fig. 3, the lower end of which is connected by a rod, n, with one of the arms o of the rock-shaft E, so that by moving the lever O, the cross-bars C and D, with their drag-bars and teeth, are adjusted as desired.

At the point where this lever O is pivoted, a plate, Z, is secured to the frame, as shown in figs. 1 and 3, and on the outer face of this plate Z there are formed two projecting shoulders, as represented in fig. 1, these shoulders being so arranged as to hold the lever O either forward or back, as required, the lever O being made to spring sufficiently to allow it to be thrown out beyond the shoulders, when it is desired to shift it.

It is sometimes desirable to sow the grain in drills, and at the same time to sow it broadcast between the drills, the object being twofold: first, if the season happens to be so wet as to destroy the seed planted deepest, or in the drills, then that sown broadcast upon the surface, not being covered so deep, will germinate, and produce a crop, while, on the other hand, if the season happens to be so dry that the shallow-covered seed, sown broadcast, does not germinate, then that planted deeper in the drills will grow, and thus insure a crop in both wet and dry seasons.

Again, in very foul land there is danger that the seeds of weeds between the drills will spring up first, and choke the wheat or other grain in the drills, and, by sowing grain on the surface, it has a chance to start before the weeds, and thus prevents their growth.

To accomplish these objects, we arrange between each pair of conductors K, that leads to the teeth, another conductor, N, as represented in fig. 3, the conductors N and K alternating the entire length of the hopper. These conductors N are to be pivoted to a set of cups, the same as the others, but are to have their lower ends or mouths thrown forward, as shown in fig. 3, and secured there by any suitable means, a hole being made in them, and a pin inserted, which pin, resting against the front side of the cup J, serves to hold them in that position.

The only object of arranging these conductors to throw the seed in advance of the drill-teeth, is that it may be covered by the drill-teeth as they stir up the earth in passing along.

In using this broadcast-attachment, there may be used an additional series of cups and rollers, or the machine may be so arranged as to divide the grain flowing from the ordinary set, and convey a portion, more or less, into the conductors N, the remainder being conveyed to the drill-teeth, the drill-teeth, with their cups and rollers, being arranged at any suitable distance apart.

It is sometimes desirable, especially on light prairie-soils, where the winter-wheat is injured by the blowing away of the soil from around the roots of the wheat, and thus exposing it to what is known as "winter-killing" or "freezing out," to protect it by sowing oats between the rows of wheat, the oats springing up and making a growth in the fall, that shelters and protects the wheat, which is of slower growth, the oats being killed by the winter's cold, and falling down among and around the wheat-plants, thus preventing the earth from being blown away, and at the same time forming a mulching for the wheat.

By providing a separate hopper for the oats, or putting divisions in the same hopper, so as to feed the wheat to the drill-teeth and the oats to the broadcast-conductors, this result may be most effectually accomplished at one operation, by means of our improved drill.

By these improvements we are enabled to produce a drill adapted to a great variety of purposes, and that is extremely simple and efficient.

Having thus described our invention,

What we claim, is—

1. The combination of the eccentric R, lifting-bar B, and the swinging plate G, for the purpose of throwing the driving-wheels in and out of gear by the act of raising or lowering the drill-tubes, substantially as described.

2. The spring-arm I, attached to the swinging plate G, and arranged to operate substantially as described, to prevent injury to the teeth of the wheels when thrown into gear.

3. The combination of the eccentric R, slotted stirrup H, and spring-arm I, with the swinging plate G, as set forth.

4. The sliding bars C and D, having the drag-bars W attached thereto, and arranged to operate as described.

5. The guard, or lip g, arranged, in relation to the wheels p and h', substantially as described.

6. The cups J, provided with the internal ledge or projection e, substantially as and for the purpose set forth.

7. The conductors K, constructed substantially as described, in two parts, and held together by the pin K, as set forth.

8. A conductor, K, pivoted to the cups which contain the feed-rollers, substantially as and for the purposes set forth.

9. The plates U, provided with grooves or recesses for receiving, holding, and guiding the cross-bars C D, as shown and described.

10. The combination of the rock-shaft E with its arms o, connecting-rods c and c', cross-bars C D, and lever O, with rod n, arranged to operate substantially as described.

11. The combination, in a grain-sowing machine, substantially such as is herein described, of the devices for sowing grain in drills, and also sowing it broadcast between the drills simultaneously, substantially as set forth.

JOHN H. THOMAS.
PHINEAS P. MAST.
CHARLES O. GARDINER.

Witnesses:
H. S. SHOWERS,
J. W. THOMAS.